United States Patent
Staffin et al.

(10) Patent No.: US 6,991,767 B1
(45) Date of Patent: Jan. 31, 2006

(54) FLUIDIZED BED GAS DISTRIBUTOR SYSTEM FOR ELEVATED TEMPERATURE OPERATION

(75) Inventors: H. Kenneth Staffin, Colonia, NJ (US); Edward P. Traina, Sayreville, NJ (US); Giovanni Rubino, Branchburg, NJ (US)

(73) Assignee: Procedyne Corp., New Brunswick, NJ (US)

(*) Notice: Subject to any disclaimer, the term of this patent is extended or adjusted under 35 U.S.C. 154(b) by 0 days.

(21) Appl. No.: 09/663,995

(22) Filed: Sep. 18, 2000

(51) Int. Cl.
*F27B 15/00* (2006.01)
*F27B 15/10* (2006.01)
*B22D 11/128* (2006.01)

(52) U.S. Cl. ............ 422/144; 422/139; 422/145; 422/146; 266/251; 164/401; 164/404

(58) Field of Classification Search ........... 422/139, 422/140, 143, 146, 144, 145, 147, 198; 502/41; 208/163; 239/548, 556; 122/4 D; 266/251, 266/252, 257; 164/131, 132, 401, 404; 148/710
See application file for complete search history.

(56) References Cited

U.S. PATENT DOCUMENTS

| | | | | |
|---|---|---|---|---|
| 3,053,704 A | * | 9/1962 | Munday | 148/710 |
| 3,763,830 A | * | 10/1973 | Robinson et al. | 122/4 D |
| 4,336,769 A | * | 6/1982 | Daman | 122/4 D |
| 4,443,551 A | | 4/1984 | Lionetti et al. | 502/41 |
| 4,512,821 A | | 4/1985 | Staffin et al. | |
| 4,524,957 A | | 6/1985 | Staffin et al. | |
| 4,547,228 A | | 10/1985 | Girrell et al. | |
| 5,423,370 A | | 6/1995 | Bonnemasou et al. | |
| 5,908,804 A | * | 6/1999 | Menon et al. | 502/38 |
| 5,962,607 A | | 10/1999 | Yamamoto et al. | 526/88 |
| 6,253,830 B1 | * | 7/2001 | Bickford et al. | 164/132 |

FOREIGN PATENT DOCUMENTS

WO  WO 98/14291  4/1998

* cited by examiner

Primary Examiner—Alexa A. Doroshenk
(74) Attorney, Agent, or Firm—Pitney Hardin LLP

(57) ABSTRACT

A method and apparatus for the debonding and sand core removal of sand cores from cast parts, the heat treating of metal parts and the removal of organic contamination from metal parts, which is utilizing a fluid bed furnace having an improved fluidizing gas distributor which discharges fluidized gas in a downward direction away from the parts in the fluidized bed.

7 Claims, 8 Drawing Sheets

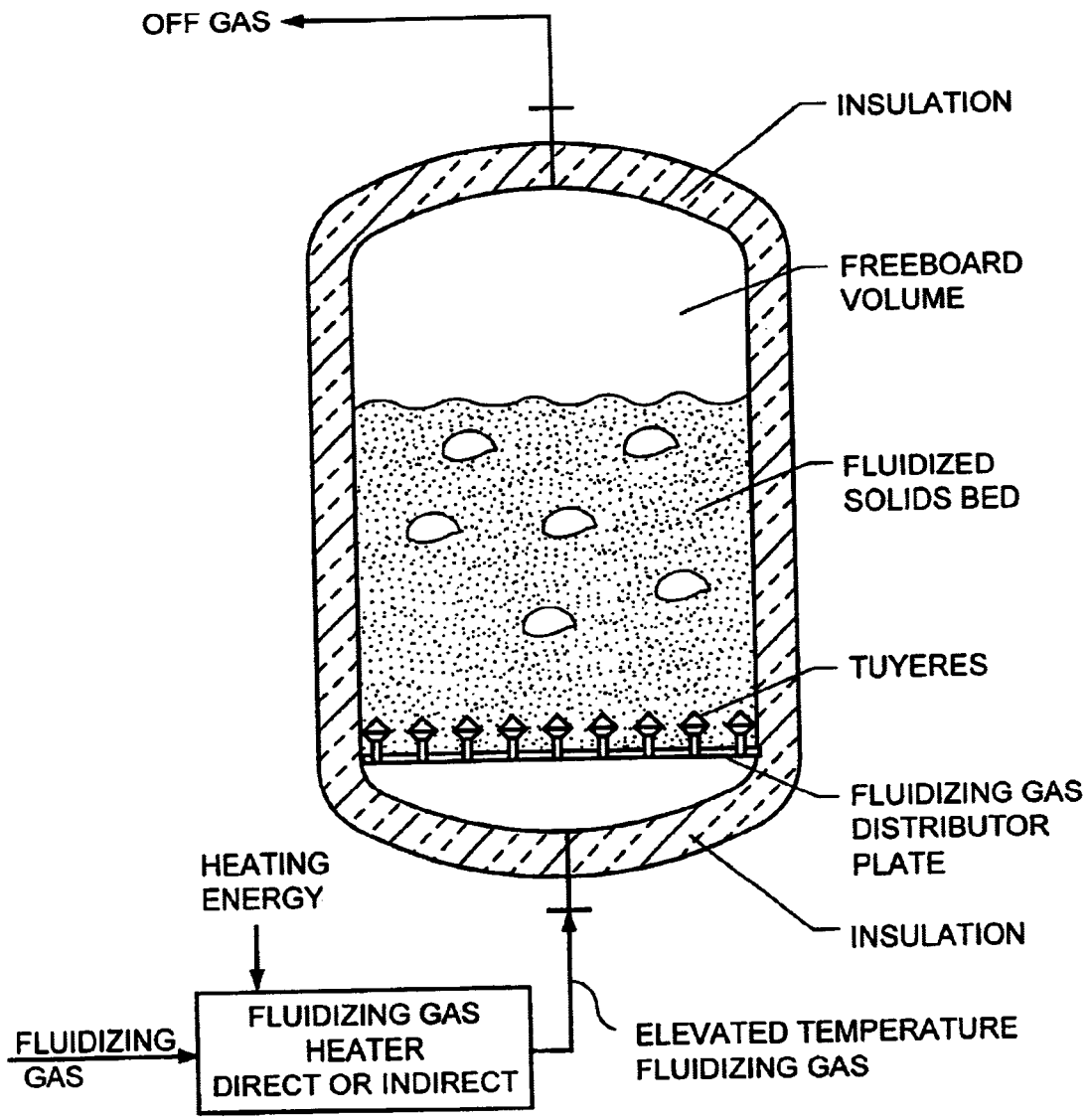
F I G. 1

FLUIDIZED BED GAS DISTRIBUTOR SYSTEM FOR ELEVATED TEMPERATURE OPERATION

FIELD OF THE INVENTION

The present invention relates generally to the methods and apparatus for the debonding and sand core removal of sand cores from cast parts, the heat treating of metal parts and the removal of organic contamination from metal parts, and relates more specifically to an improved method and apparatus utilizing a fluid bed furnace equipped with an improved fluidizing gas distributor.

BACKGROUND OF THE INVENTION

In the casting of ferrous and non ferrous metal into parts, the cast part is formed by pouring the molten ferrous or non ferrous metal into a mold. When the part has internal openings or paths, sand cores are made using foundry sand and a binder to the shape of the internal openings or paths, and are positioned in the proper location in the mold. The molten metal is poured into the volume between the mold and the core(s) usually surrounding some or most of the core. When the metal solidifies, the mold is opened and the part is removed. In most cases, the core(s) remain in the interior regions its presence has formed and must be removed.

U.S. Pat. No. 5,423,370, the disclosure of which is incorporated herein by reference, describes the invention of a fluid bed furnace for the removal of sand cores from castings, employing a thermal process based on the use of fluidized sand of the same type as used to make the sand core. This same patent describes the use of the fluid bed furnace for the heat treating of the aluminum castings.

In the case of ferrous and non ferrous metal parts formed by other methods than casting, the fluid bed has been established as an important processing approach for the heat treating and cleaning of parts and other objects in significant commercial applications. This is exemplified by U.S. Pat. Nos. 4,512,821; 4,524,957; and, 4,547,228, the disclosures of which are incorporated herein by reference.

There are a number of known techniques to provide energy input to a fluid bed furnace to achieve the required temperature level of the fluidized solids bed and meet the energy requirement of the specific process being performed, plus the heat losses of the system. The source of energy input to a fluid bed furnace system is typically electricity or fuel such as natural gas or oil.

The mechanism of transferring the energy from an energy source to the fluidized solids bed is typically accomplished by one or a combination of the following methods:

Mechanism i: Heating the fluidizing gas phase before entering the furnace to a temperature above the operating temperature of the fluidized solids bed, as shown in FIG. 1. When the high temperature fluidizing gas enters the fluid bed through the fluidizing gas distribution tuyeres, it provides the required energy input. This is termed "direct heating".

Mechanism ii: Transferring energy through heat transfer surfaces in contact with the fluidized solids bed, typically through heating tubes submerged in the fluidized solids bed, or through the walls of the vessel housing the fluidized solids bed from a heating mantle surrounding the walls, as shown in FIG. 2. This mechanism of energy input is termed "indirect heating".

Mechanism iii: Direct injection of fuel into the fluidized solids bed in gaseous, liquid or solids form and combusting the fuel while it is within the fluidized solids bed; i.e., below the top level of the fluidized solids bed, as shown in FIG. 3.

The choice of energy source, is typically economically driven. The choice of mechanism of energy transfer to the fluid bed typically depends upon the geometric configuration of the furnace and the characteristics of the process application involved. This choice is typically determined by the gas phase environment required by the submerged parts.

In applications where the products being process cannot be contacted by products of combustion of typical fuels, the mechanism of transferring energy to the fluid bed must be limited to indirect heating of the fluid bed by Mechanism ii, and/or indirect heating of the fluidizing gas to elevate its temperature followed by direct heating of the fluid bed by Mechanism i.

In these cases, direct injection of fuel into the fluidized solids bed by Mechanism iii, cannot be employed due to combustion gases being present in the fluidized solids bed which has an adverse effect on the quality of the products.

In cases where the combustion products of the typical fuels can contact the parts without quality degradation, and the operating temperature of the fluidized solids in the furnace is higher than the ignition temperature of the fuel, so there is no concern about ensuring complete combustion of the fuel in the fluidized bed of solids, economical considerations generally favor Mechanism iii, above as shown in FIG. 3. In FIG. 3, the unit is shown equipped with both direct fuel injection and direct combustion air injection. In situations where the fluidizing gas is air, which is the case in many important commercial applications, the direct injection of combustion air is not required because the fluidizing air provides the necessary oxygen for combustion. It is only necessary to feed the fuel to the fluidized bed.

In most cases involving heat treating of metal parts, it is required to maintain careful control of the composition of the fluidizing gas. This requirement typically eliminates Mechanism iii, above from consideration for these applications.

For the very important application to sand core debonding of aluminum castings and heat treating aluminum castings and other aluminum parts, the processes take place at approximately 550° C. This temperature is below the ignition point of natural gas and other fuels so the use of Mechanism iii, is frequently eliminated based on safety concerns and/or the costs involved in protection devices to practice Mechanism iii, safely.

This typically limits consideration to Mechanisms i and ii, above for the important commercial applications involving processing of aluminum castings and other aluminum parts and heat treating of metals.

Mechanism i, is generally the lower cost approach to providing the required energy to the fluidized solids bed using a fluidizing gas heater to elevate the temperature of the fluidizing gas. The maximum rate of energy transfer to the gas fluidized solids bed possible by this mechanism, is limited by the maximum temperature the furnace fluidizing gas distribution tuyere system can withstand mechanically, and the maximum fluidizing velocity that can be applied to the solids being fluidized without excessive entrainment of solids in the fluidizing gas exiting from the furnace.

The temperature of the fluidizing gas is typically elevated using a gas heater, and then feeding the high temperature fluidizing gas through the distribution tuyeres of the bed, as shown in FIG. 1. The fluidizing gas heater can be either direct fuel fired when the products of combustion are acceptable in the gas phase of the fluidized solids, or indirectly heated by fuel or electricity when the application cannot accept products of combustion in the fluidizing gas phase.

The primary disadvantage to the use of Mechanism i, is that in applications requiring high rates of energy input to the gas fluidized solids, the temperature of the fluidizing gas must be significantly higher than the temperature of the fluidized solids bed.

This high temperature fluidizing gas elevates the temperature of the fluidized solids in the immediate vicinity of the fluidizing gas discharge tuyeres well above average bed temperature. This high temperature can in some cases, damage the parts being processed if the parts come close to, or contact a tuyere.

As an example, for the case of processing aluminum metal parts, a typical fluid bed furnace might be solution annealing the parts at 500° C. in the bed of fluidizing solids with the fluidizing gas temperature at approximately 815° C. If an aluminum part comes in contact or in the close vicinity of a fluidizing gas tuyere, the part can be melted or seriously distorted. In addition, there are typically small shavings, pieces, or chips of aluminum which fall from the parts being processed which find their way to the bottom of the fluid bed furnace and gradually accumulate over a period of time. When these pieces approach the vicinity of a tuyere, or contact a tuyere, they are usually melted and gradually surround the tuyeres and impede the flow of air.

The improved fluidizing gas distributor of this invention reduces the temperature of the fluidizing gas before it discharges through the tuyeres, thereby eliminating the local high temperature regions in the vicinity of the tuyere and eliminates the problem of melting or distorting the parts in the vicinity of the tuyeres.

This invention is a new improved approach to transferring energy into a fluidized bed and can benefit applications that can or cannot accept products of combustion of the energy source in the fluidization gas phase, and whether or not the temperature of the fluidized solids bed is above or below the ignition temperature of the fuel used as the energy source.

It accomplishes this broad application advantage by combining some of the concepts of Mechanism i and Mechanism ii, in an innovative arrangement of heating the fluidized solids by indirect heat transfer followed by direct heating by the fluidizing gas discharging from the gas distribution arrangement. This configuration can be particularly favorable for heat treating metal parts, cleaning metal parts, removing sand cores and enclosing molds from castings, but is also advantageous in some fluid bed reactor configurations involving fluid bed furnaces.

SUMMARY OF THE INVENTION

The invention comprises method and apparatus which overcomes the deficiency in typical fluidizing gas distributors when energy is supplied to a high temperature fluid bed furnace or reactor by high temperature fluidizing gas through the fluidizing gas distributor. This improved gas phase distributor involves a piping array which is mounted in the fluidized bed of solids which conveys the high temperature fluidizing gas to the distribution tuyeres spaced in relatively uniform positions at an elevation in the lower portion of the bed of granular solids forming the fluidized solids. The distribution tuyeres are connected to the bottom of the piping array and are contiguous with the pipes forming the array. The tuyeres are discharging the high temperature fluidizing gas in a downward direction causing the fluidized bed phenomenon to initiate at an elevation at or slightly below the point of discharge of the tuyeres.

This configuration ensures that the piping array is at an elevation above the initiation of fluidization, and therefore, in the bed of fluidized solids. This results in significant indirect heat transfer from the fluidizing gas in the distribution piping through the pipe walls of the array into the fluidized bed due to the generally favorable heat transfer behavior of fluidized solids. This indirect heat transfer causes the temperature of the gas phase discharging through the tuyere distributors to be lower than the temperature of the fluidizing gas which was fed to the piping array. This condition yields a more uniform temperature at the lower part of the fluidized bed in the vicinity of the distribution tuyeres.

This gas phase distribution invention reduces or eliminates the high temperature zones in the vicinity of the distribution tuyeres which can degrade or destroy the parts being treated which are located near the lower portion of the fluid bed furnace and make it impossible to exploit the benefits of a fluid bed furnace with a directly heated energy transfer mechanism involving high temperature fluidizing gas.

This gas phase distribution arrangement has the additional advantage that the downward direction of discharge of the tuyeres reduces the tendency of particles of solids to enter the piping array through the tuyere gas phase discharge holes.

BRIEF DESCRIPTION OF THE DRAWINGS

FIG. 1, is a schematic drawing of a typical fluid bed furnace using elevated temperature fluidizing gas as the mechanism of transferring energy into the bed of fluidized solids.

FIG. 2, also shows the optional use of a fluidizing gas heater to further supplement the heat transfer rate to the bed of fluidized solids.

DETAILED DESCRIPTION OF THE PREFERRED EMBODIMENT

Figure 4:
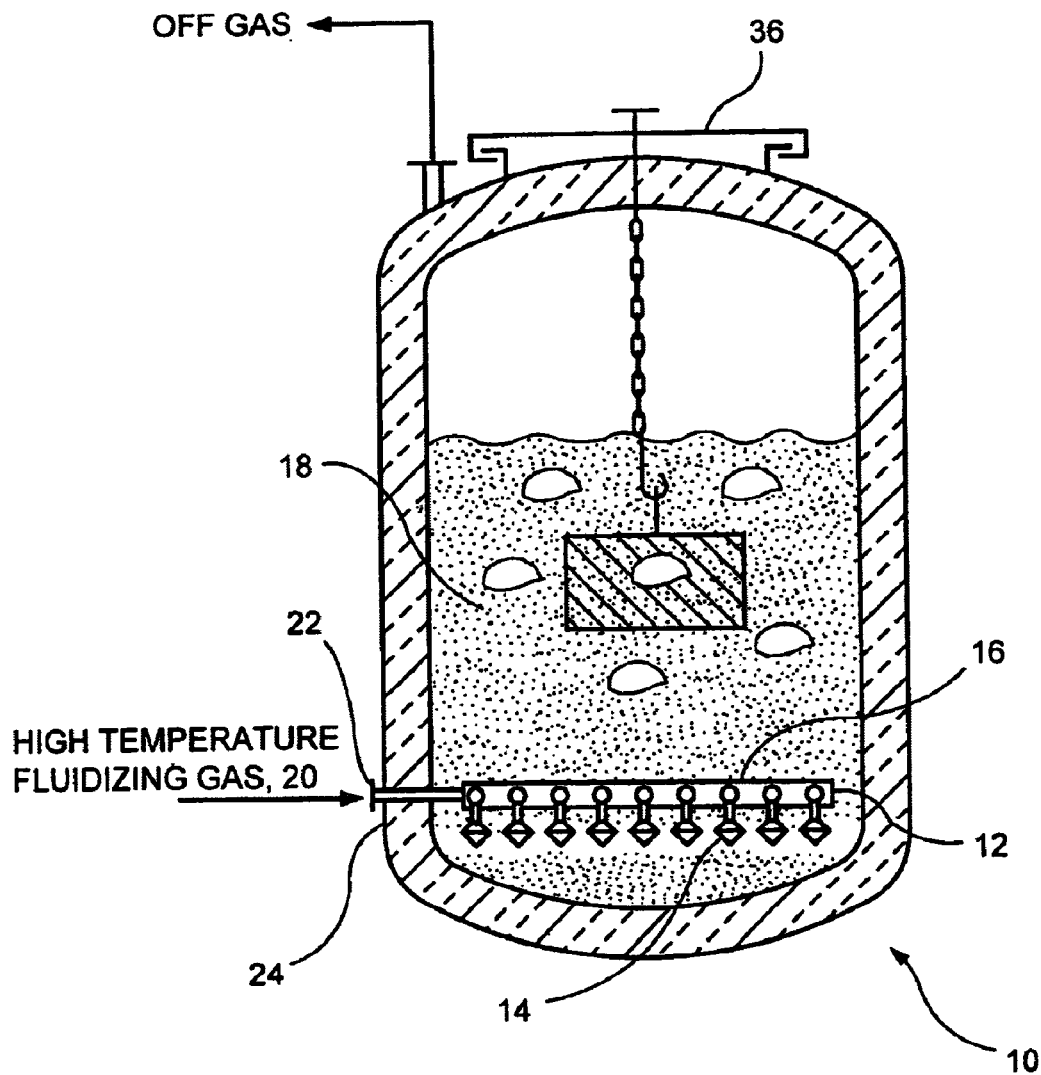
FIG. 4, is a schematic drawing of a typical fluid bed furnace equipped with the improved fluidized bed gas distributor system of this invention for processing parts in typical sand core debonding and heat treating of aluminum castings and other metals.

Turning now to the figures where like parts will be similarly numbered, FIG. 4, shows a high temperature fluidized bed furnace 10 in one typical configuration involving the processing of a major metal part. This furnace is equipped with a fluidized bed gas distributor 12. This gas distributor 12 is shown in more detail in FIG. 5 and the downward discharging tuyere generally designated 14 is shown in FIG. 6.

Figure 5:
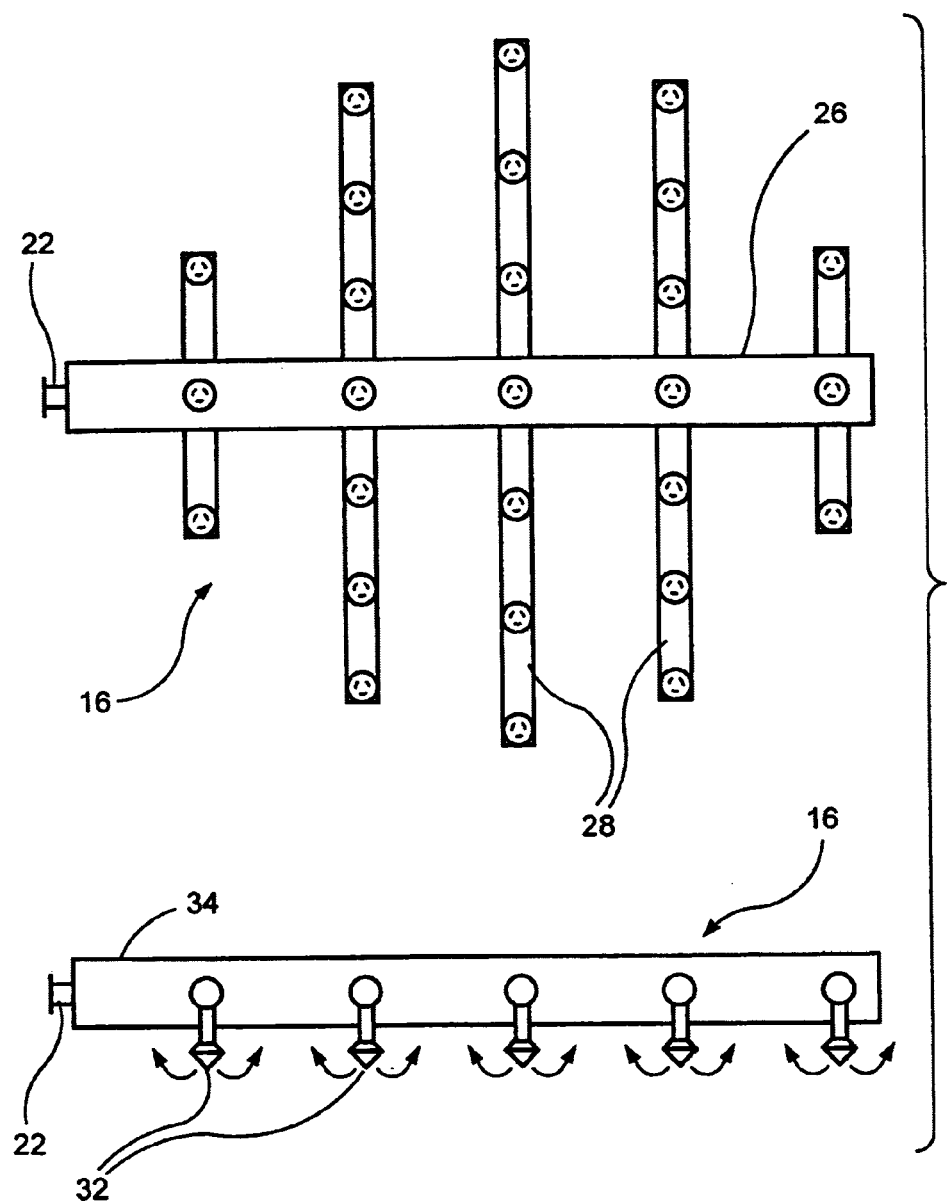
FIG. 5, is a top plan and side view of the improved fluidizing gas distributor.
Figure 6:
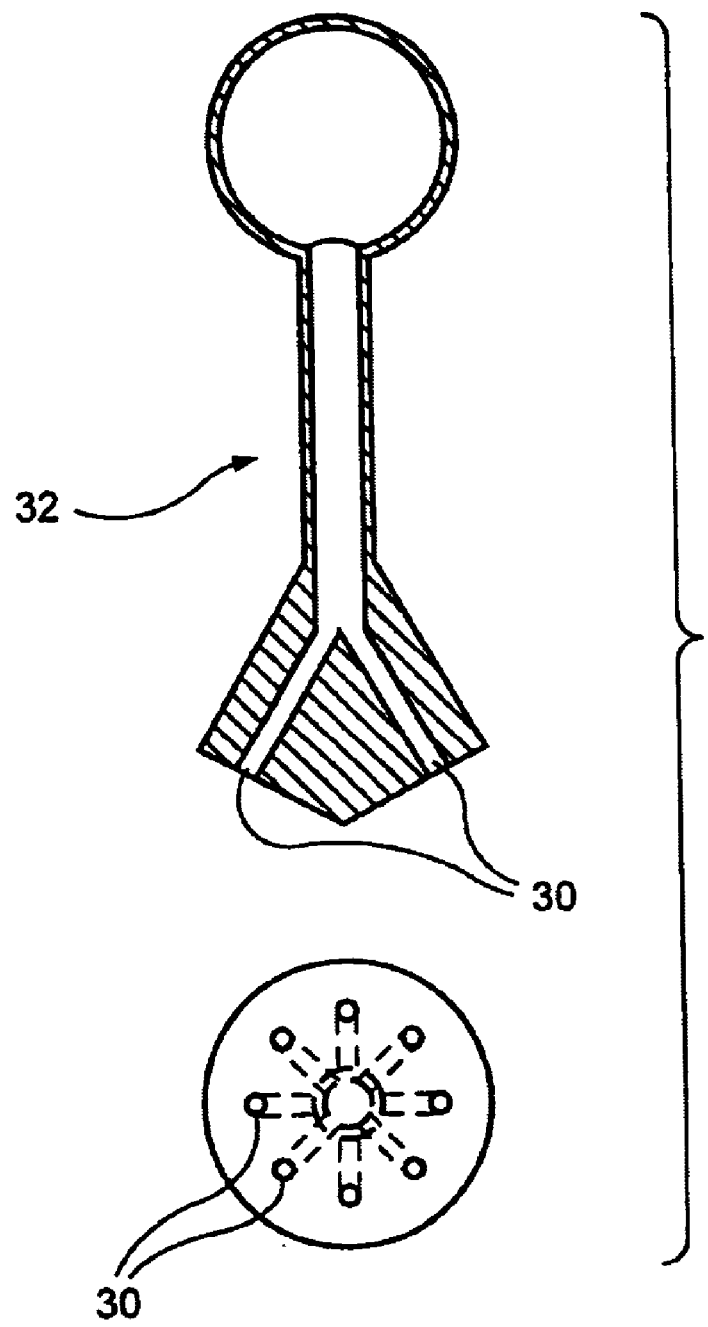
FIG. 6, is a side section and top plan view of a downward discharging tuyere of an improved fluidizing gas distributor.

In this invention, high temperature fluidizing gas is distributed through the furnace 10 in a horizontal plane by a piping array 16 as shown in FIGS. 4, 5, and 6. With the discharge of the fluidizing gas from the tuyeres 14 located below the distributing piping array 16, the elevation level of initiation of fluidization of the solids is below the piping array 16. Therefore, the piping array 16 has fluidized solids bed 18 all around it, and the heat transfer rate from the piping array 16 to the bed of gas fluidized solids benefits from the typically favorable heat transfer coefficients between heat transfer surfaces in contact with gas fluidized solids and the fluidized solids themselves. Typically in applications involving foundry sands for the particles, the heat transfer coefficients are in the range of 20 to 100 BTU/hr. ft$^{2\circ}$ F.

Referring to FIG. 4, the high temperature fluidizing gas 20 enters the piping array 16 through a feed port 22 in the side of the furnace vessel wall 24, and flows to the array of connecting pipes 16 which are continuous with the feed pipe 22. This piping array 16 is shown in FIG. 5. Referring to FIG. 5, the entry of the high temperature fluidizing gas is through feed port 22. The flow is typically into the main header pipe 26, into the piping array of branches 28, and out through the holes in the downward discharging tuyeres 32. The gas phase then turns in its typical upward direction in the fluidized bed. FIG. 6, shows one embodiment of a downward discharging tuyere 32.

With the high rate of convective heat transfer from the piping array 16 to the fluidized bed of solids 18, the temperature of the fluidizing gas discharging from the tuyeres 32, is lowered from its feed temperature through port 22, to a temperature considerably closer to the fluidized bed temperature.

Thus the energy input to the fluidized solids is divided between that being convectively transferred indirectly from the high temperature gas flowing through the piping array 16 through the pipe wall 34 to the fluidized solids bed, while the remainder of energy transferred into the fluidized solids is achieved by the direct introduction of the fluidizing gas through the tuyeres 32 into the fluidized solids.

By increasing the heat transfer area of the piping array 16, it is possible to reduce the temperature of the fluidizing gas exiting from the tuyeres 32 to a level close enough to fluidized bed temperature to avoid any damage to parts in the vicinity of the tuyere discharge.

In addition, with the tuyeres 32 mounted in a downward direction, it is possible to conveniently fasten a grating or screen to the top of the piping array without disturbing the uniform flow pattern existing from the tuyeres 32 to prevent small parts or pieces of casting material from falling into the vicinity of the tuyere discharge and either blocking the discharge or in the case of lower melting point metal parts like aluminum, from softening or melting from too high a temperature of tuyere discharge.

Figure 8:
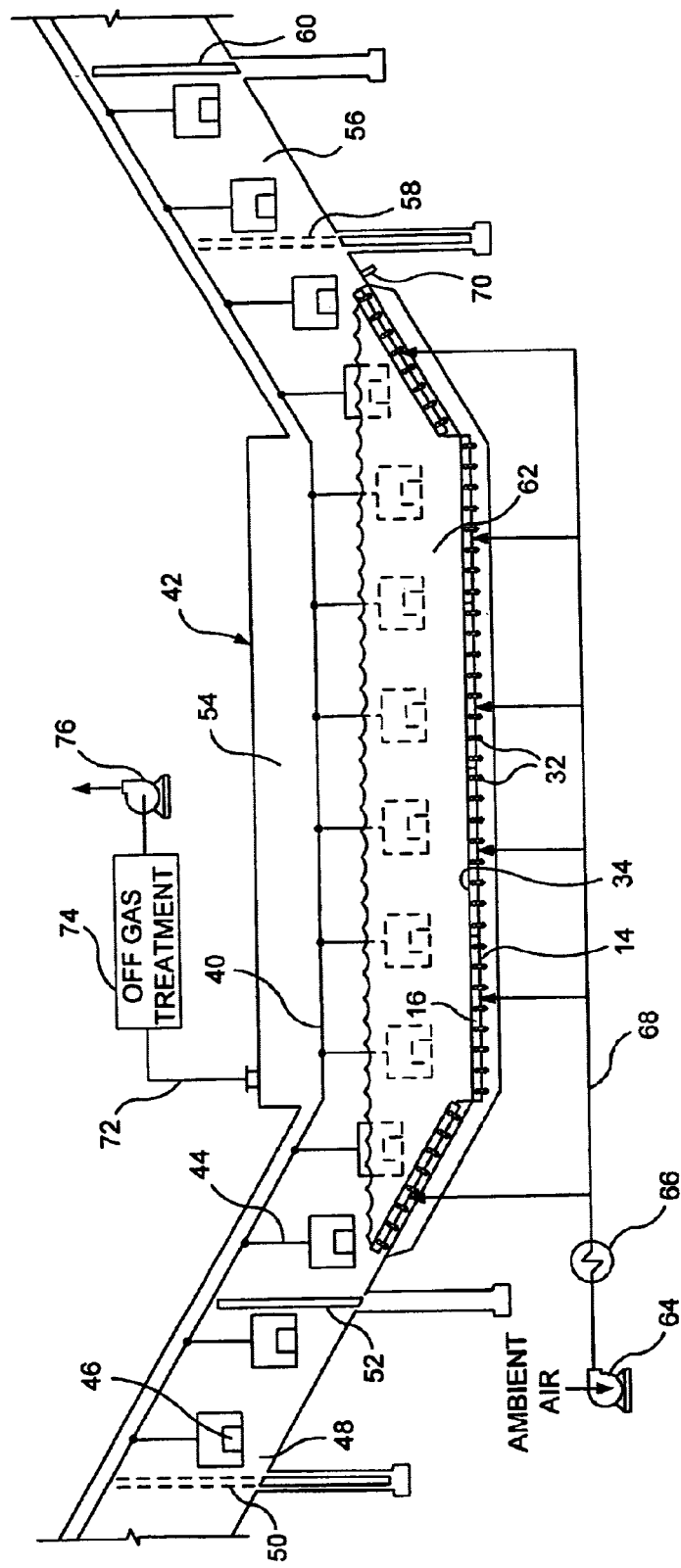
FIG. 8, is a side sectional view of the preferred embodiment of the improved fluidizing gas distributor in a large scale aluminum casting sand core debonding application, where the feed of casting is on the basis of a generally repetitive cycle basis.

Preferred embodiments of this invention are shown in FIGS. 4 and 8, but there are other arrangements possible to achieve the benefits of this design approach. FIG. 4, is more typical of lower volume processing where loads are fed through a feed door 36 typically in the top of the furnace.

Figure 7:
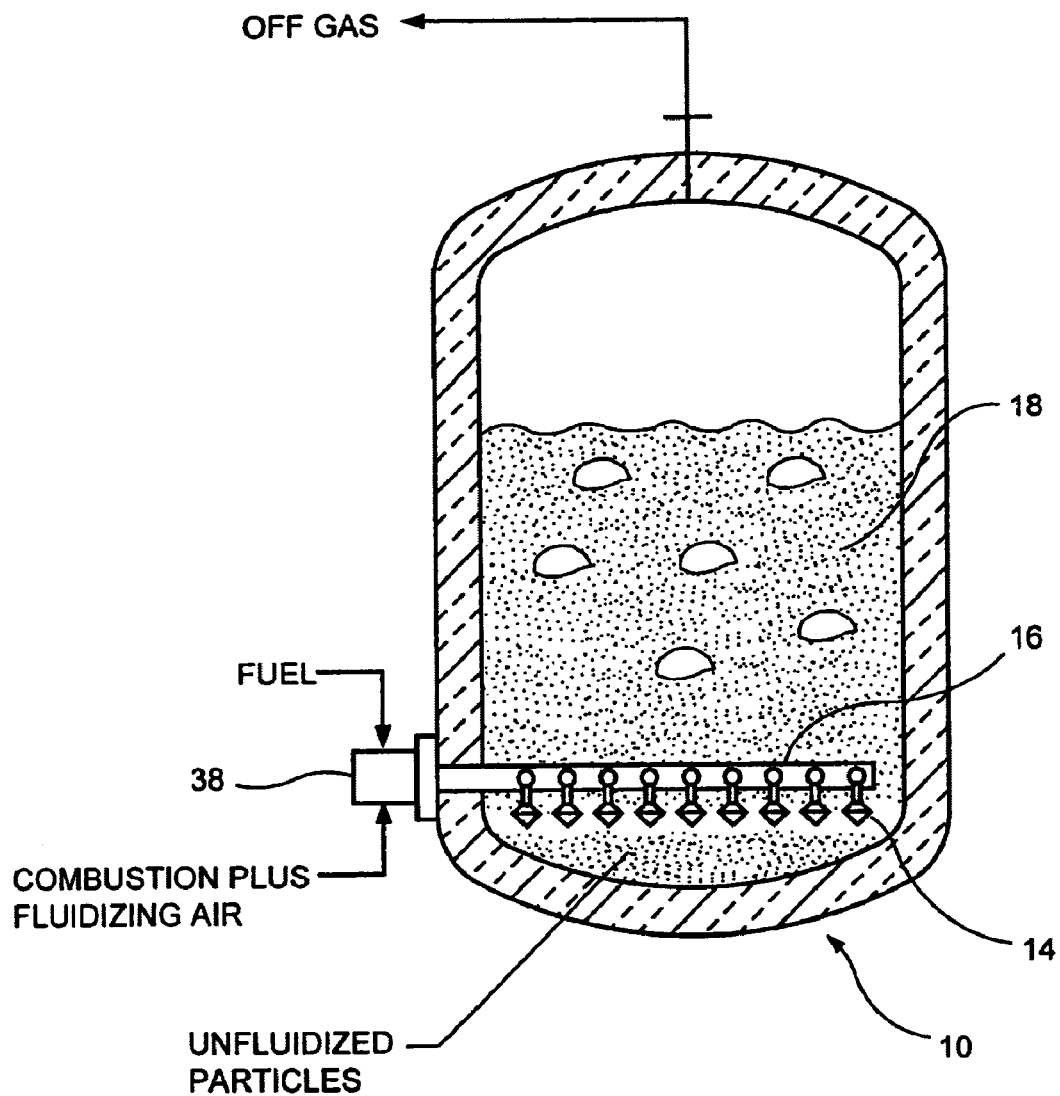
FIG. 7, is a side partially sectional view of the improved fluidizing gas distributor equipped with a direct firing positive displacement burner firing directly into the piping array of the fluidizing gas distributor.

FIG. 7, shows a preferred embodiment of this invention for the case of parts which can be subjected to fuel combustion gas phase contact without damage to the parts. In this situation, an economical preferred embodiment is to mount a positive displacement burner 38 discharging directly into the gas distribution array, as shown.

FIG. 8, is more typical of larger volume processes where parts are fed by conveyor 40 on a repetitive basis through the furnace system.

Referring to FIG. 8, there is seen diagrammatically a typical continuous or semi-continuous thermal process for carrying out the method of the invention with respect to sand core removal involving high volume production operations. This is a typical example of an application of the invention. The application can be practiced with other configurations of fluid bed furnace and/or mechanical conveyors.

A fluidized bed furnace 42 is equipped with a continuous conveyor 40, which can be a chain type or any of the conveyors of this general category. The conveyor is conveying baskets or fixtures 44, which are capable of holding the castings 46 and moving them singly or in groups continuously, or cyclically (semi-continuously) through the furnace 42 in a uniform manner and at a linear speed which is adjusted to achieve the required residence time of the parts 46 in the furnace.

The parts enter the furnace, vestibule 48 through a door 50, which can be automatically opened and closed. After door 50 is closed, the following door 52, opens to allow the basket or fixture 46 to leave the vestibule 48, and enter the furnace volume 54. These feed doors 50 and 52 keep alternately opening and closing as conveyor 40 moves the successive line of baskets or fixtures through the furnace to the discharge vestibule 56.

The parts exit the furnace into the discharge vestibule 56 through door 58.

After the discharging basket or fixture 44 enters the discharge vestibule 56, door 58 closes and door 60 opens to allow the basket or fixture to exit the vestibule 56 and continue to the next processing step for the castings or to an unloading area where the casting 46 is removed from the basket or fixture, if this process only involves sand core debonding. These discharge doors 58 and 60 keep alternately opening and closing as conveyor 40 moves the successive line of baskets or fixtures out of the furnace 42.

Furnace 42, contains a bed of fluidized solids 62, which in the preferred embodiment is fluidized foundry sand of the same composition and size ranges as was used to manufacture the sand cores which are being removed in this furnace. The level of fluidized solids is such so that the declining elevation of conveyor 40, at the feed end, followed by a horizontal level, and then followed by the inclining elevation of conveyor 40, at the discharge end, are such that the baskets or fixtures 44, containing the parts 46, are passed through the bed of fluidized solids at a controlled rate.

The fluidizing air to create the fluidized bed of granular solids is typically ambient air pumped by blower 64, through air heater 66, and through distribution duct 68, which feeds the heated air to the piping array 16, which forms the improved air distribution system which feeds the fluidizing air to the downward directed tuyeres 32, into the fluidized bed 62, which accomplishes uniform distribution of the air into the fluidized solids thereby levitating the granular particles and creating the fluidized solids phenomenon at an elevation below the distribution piping array.

The heated fluidizing air also provides the required energy to maintain and control the fluidized solids at the temperature required to debond the sand cores by convective heat through the walls 34 of the piping array 16 forming the improved fluidizing air distribution system and subsequently, after its temperature has been reduced by this convective heat transfer, by discharging through the ports or holes 30 of the downward discharging tuyeres 32 directly into the bed of fluidized solids when it gives up additional energy to the fluidized solids as its temperature is reduced to the temperature of the fluidized solids bed.

Thus the temperature of the fluidized solids in the vicinity of the discharge of the discharge of the tuyeres is not as high with this improved fluidizing air distribution system due to the indirect convective heat transfer through the piping array 16, as it would be in the absence of this innovative improvement. With this reduction in fluidizing air temperature exiting from the tuyeres 32, the problem of castings or parts being damaged due to close proximity to the tuyeres is eliminated as well as the problem of pieces of aluminum or other discard pieces of the part which are removed from the casting and fall to the bottom of the furnace where they can be melted by the high temperate fluidizing air discharges from tuyeres.

The temperature and residence time of an aluminum casting in furnace 42 to accomplish the thermal decomposition of the bonding agent is typically accomplished in the temperature range of 450° C. to 550° C. with the parts at temperature approximately 20 to 90 minutes depending upon the geometry and size of the parts involved.

The added foundry sand from the sand cores which flows into the fluidized bed is discharged from the furnace by overflowing through overflow pipe 70 and is then collected, cooled, sometimes sieved, and is typically ready for reuse.

The fluidizing gas from the bed of fluidized solids 62 exits the furnace through duct 72, is then passed through an off-gas treatment, system 24, typically comprising a cyclone for particulate removal and an afterburner to oxidize any volatile organic carbon (VOC) compounds from the thermal decomposition of the sand core binding agent and then through an exhauster 76, which maintains the fluidized bed furnace 42 under a slightly negative pressure, typically less than 0.5 inches w.c. and causes the fluidizing gas to exit the furnace system.

Figure 2:
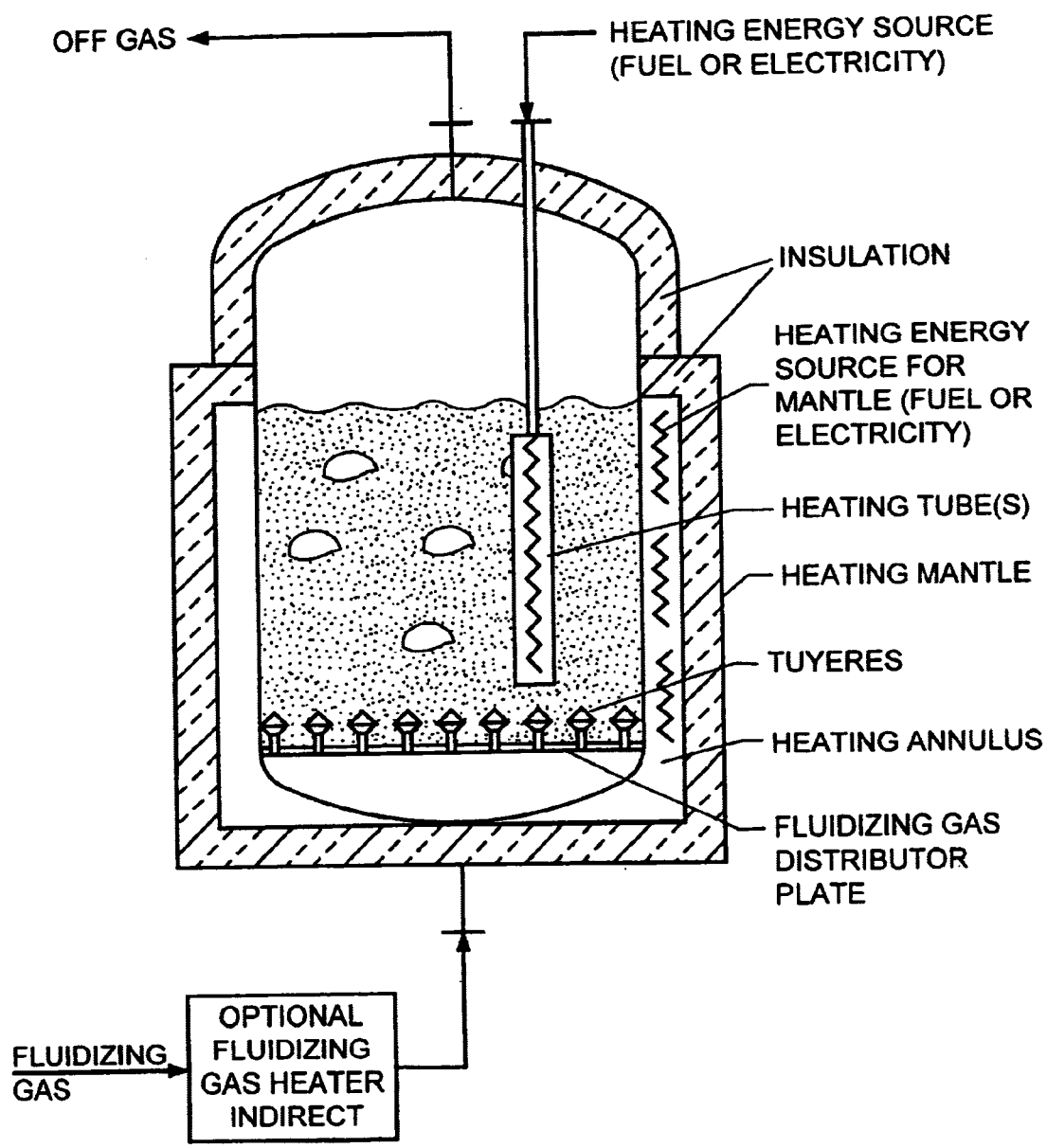
FIG. 2, is a schematic drawing of a typical fluid bed furnace using indirect heating as the mechanism of transferring energy into the bed. This figure shows indirect heating using a heating mantle to transfer heat through the wall of the fluid bed containing vessel as well as indirect heating tubes. The former approach is typically used for smaller furnaces when there is sufficient vessel wall area relative to the volume of the fluid bed to transfer the required energy input. The number of heating tubes required depend upon the amount of indirect heat transfer area needed to meet the required heat transfer rate of the process.
Figure 3:
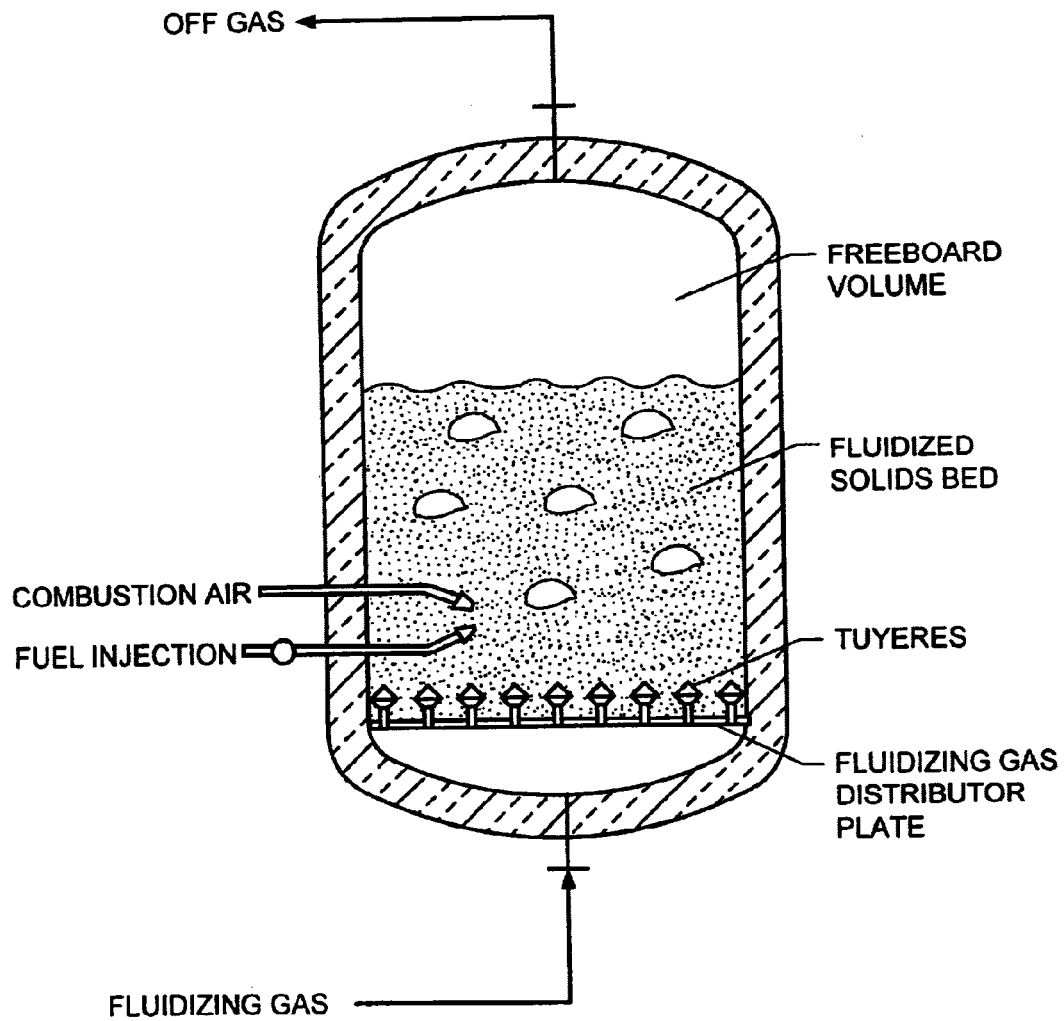
FIG. 3, is a schematic drawing of a typical fluid bed furnace arrangement using direct injection of fuel into the fluidized bed as the mechanism of transferring energy into the bed. In this configuration the fuel is typically gaseous, for example natural gas, or liquid, for example, oil. This furnace is equipped with a distributor plate containing tuyeres.

When the requirement for sand core debonding is subsequently followed by a solution annealing heat treating step, the same system shown in FIG. 2, may be employed for both steps with the exception that fluidized bed furnace 42 must be made sufficiently long to provide for the residence time requirements to accomplish both processing steps.

The following application involving aluminum automotive engine parts was performed in a pilot plant operation which simulated the process of this invention:

| Parts: | Aluminum castings/Engine blocks | |
|---|---|---|
| Engine block: | 195 Kg each | |
| Sand mold and cores weight: | 45 Kg in and surrounding each block | |
| No. of blocks/test: | 2 | |
| Sand Core Debonding Conditions: | Temperature: | 500° C. |
| | Residence Time: | 90 minutes |
| | Environment: | Fluidized Solids/ Foundry Sand |
| Heat Treating Conditions: | Temperature: | 500° C. |
| | Residence Time: | 5 hrs. This was total time including the 90 minutes of sand core debonding. Both operations were conducted in the same furnace in series. |
| Quench: | Rapid quench to 200° C. in a fluidized solids bed of foundry sand. Fluidized solids cooled using water cooling coils. | |
| Aging: | 3 hrs. at 230° C. in fluidized bed aging furnace Ambient Air Cooling to 60° C. | |
| Heat Treating results: | Blocks achieved a Brinell Hardness of 93–109. | |

It should be understood that the preferred embodiments of this process have been disclosed by way of examples, and that other modifications may occur to those skilled in the art without departing from the scope and split of the appended claims.

What is claimed is:

1. A fluid bed reactor or furnace for heat-treating parts comprising a fluid bed reactor or furnace including at least one door for entry and exit of the parts and a gas phase distributor including a gas phase piping array discharging into a fluid bed of granular solids through a plurality of tuyeres coupled to and mounted beneath the piping array in a perpendicular orientation such that the granular solids below the piping array are fluidized thereby causing the fluidizing gas in the piping array to indirectly heat the fluidized bed prior to entering the fluidized bed through the tuyeres, wherein the top of the piping array is adapted with a screen.

2. The fluid bed reactor or furnace of claim 1, wherein the gas phase distributor discharges the fluidizing gas through openings or ports in a bottom portion of the piping array.

3. The fluid bed reactor or furnace of claim 2, wherein the gas phase distributor further comprises a heat exchanger in a feed line to the gas phase distributor such that the heat exchanger location is above the fluidizing gas distribution ports and submerged in the fluidized solids, thereby permitting indirect heat transfer from the fluidizing gas prior to the gas phase distributor.

4. The fluid bed reactor or furnace of claim 1, further comprising metal parts in the fluid bed of granular solids.

5. The fluid bed reactor or furnace of claim 1, further comprising metal castings with sand cores in the fluid bed of granular solids.

6. The fluid bed reactor or furnace of claim 4, wherein the metal parts are of aluminum.

7. The fluid bed reactor or furnace of claim 5, wherein the metal castings are of aluminum.

\* \* \* \* \*